(12) United States Patent
Chou

(10) Patent No.: US 8,081,243 B2
(45) Date of Patent: Dec. 20, 2011

(54) CORRELATED DOUBLE SAMPLING CIRCUIT AND CMOS IMAGE SENSOR UNIT

(75) Inventor: Kuo-Yu Chou, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 823 days.

(21) Appl. No.: 12/125,914

(22) Filed: May 23, 2008

(65) Prior Publication Data

US 2009/0244335 A1  Oct. 1, 2009

(30) Foreign Application Priority Data

Mar. 28, 2008  (TW) ................................ 97111537 A

(51) Int. Cl.
  *H04N 3/14*   (2006.01)
  *H04N 5/335*  (2011.01)
  *H04N 5/217*  (2011.01)
(52) U.S. Cl. ......... 348/294; 348/241; 348/300; 348/308
(58) Field of Classification Search .................. 348/241, 348/294, 300, 308
  See application file for complete search history.

(56) References Cited

U.S. PATENT DOCUMENTS

| | | | |
|---|---|---|---|
| 5,736,886 A | 4/1998 | Mangelsdorf et al. | |
| 5,965,871 A | 10/1999 | Zhou et al. | |
| 6,018,364 A | 1/2000 | Mangelsdorf | |
| 6,421,085 B1 | 7/2002 | Xu | |
| 7,133,074 B1 * | 11/2006 | Brehmer et al. | 348/308 |
| 2003/0001075 A1 | 1/2003 | Mukherjee et al. | |

OTHER PUBLICATIONS

D. Litwiller "CCD vs. CMOS: Facts and Fiction", Photonics Spectra, Jan. 2001, p1-4.
"Office Action of Taiwan Counterpart Application", issued on Aug. 30, 2011, p1-p12, in which the listed references were cited.

\* cited by examiner

*Primary Examiner* — William Choi
(74) *Attorney, Agent, or Firm* — Jianq Chyun IP Office

(57) ABSTRACT

Embodiments of the present invention provide a correlated double sampling (CDS) circuit and a CMOS image sensor unit using the CDS circuit. The CDS circuit shifts levels of sampled sensing signal and reset signal with equal amounts. Thus a voltage difference of the sampled sensing signal and the reset signal remains unchanged, and their levels may fall within a linear input range by adjusting their levels. Compared to a conventional CDS circuit, a gain of the CDS circuit provided by the embodiment of the present invention is not reduced, and thus a design complexity of a rear circuit thereof is lower, and an induced noise is relatively low. Furthermore, the CMOS image sensor unit using the CDS circuit provided by the embodiment also has these advantages.

19 Claims, 7 Drawing Sheets

CORRELATED DOUBLE SAMPLING CIRCUIT AND CMOS IMAGE SENSOR UNIT

CROSS-REFERENCE TO RELATED APPLICATION

This application claims the priority benefit of Taiwan application serial no. 97111537, filed on Mar. 28, 2008. The entirety of the above-mentioned patent application is hereby incorporated by reference herein and made a part of this specification.

BACKGROUND OF THE INVENTION

1. Field of the Invention

The present invention relates to a complementary metal-oxide-semiconductor (CMOS) sensor. More particularly, the present invention relates to a correlated double sampling (CDS) circuit of a CMOS image sensor and a CMOS image sensor unit using the same.

2. Description of Related Art

With development of technology, digital cameras are widely used for freely recording images. The digital camera has a plurality of image sensor units for sensing images, which may transform optical signals into electronic signals and store the electronic signals in a memory card or other storage medium.

Referring to FIG. 1, FIG. 1 is a block diagram illustrating a conventional CMOS image sensor unit 10. The conventional image sensor unit 10 includes a timing generator 11, a row decoder 12, a column decoder 13, a pixel array 14, a correlated double sampling (CDS) circuit 15 and an analog signal processing (ASP) unit 16. Wherein, the ASP unit 16 includes a programmable gain amplifier (PGA) 160 and an analog-to-digital converter (ADC) 161.

The timing generator 11 is coupled to the row decoder 12, the column decoder 13 and the CDS circuit 15. The pixel array 14 is coupled to the row decoder 12 and the CDS circuit 15. The ASP unit 16 is coupled to the CDS circuit 15. The PGA 160 is coupled to an input terminal of the ASP unit 16 and the ADC 161, and the ADC 161 is coupled to an output terminal of the ASP unit 16.

The timing generator 11 generates a plurality of clock signals for controlling the row decoder 12, the column decoder 13 and the CDS circuit 15. The pixel array 14 senses optical signals based on an output of the row decoder 12, and transforms the optical signals into electronic signals. The CDS circuit 15 samples the electronic signals transformed by the pixel array 14 based on an output of the column decoder 13, and transmits sampling results to the ASP unit 16 for processing. The PGA 160 within the ASP unit 16 amplifies a voltage difference of the sampling results (the sampling results include levels of a reset signal and a sensed signal) according to a preset gain thereof, and transmits an amplified result to the ADC 161 to perform an analog-to-digital conversion, so as to generate a digital image signal.

According to the above description, during signal processing, the electronic signals output from the pixel array 14 are first stored in the CDS circuit 15, and then are sequentially read by the ASP unit 16. If an output signal of the pixel array 14 or an output signal of the CDS circuit 15 is mixed with noise, then it is hard for the rear ASP unit 16 to process. If the output signal of the pixel array 14 or the output signal of the CDS circuit 15 is too small, the PGA 160 then has to be set with a relatively great gain for compensation, which may lead to a design difficulty of the PGA 160 and the ADC 161. Therefore, noise influence to the output signals of the pixel array 14 and the CDS circuit 15 has to be reduced, and excessive low gains thereof have to be avoided.

The conventional CDS circuit 15 is generally formed by source follower amplifiers or buffers. Since a linear input range of the source follower amplifiers or the buffers is limited, which is generally limited within 0.5 volts to 1.5 volts, excessive high or excessive low output electronic signal of the pixel array 14 may cause a distortion of the output of the CDS circuit 15. When the image sensor unit 10 operates, the pixel array 14 sequentially outputs the level of the reset signal and the level of the sensed signal, and a difference of the two signals represents an actual image signal.

Generally, the CDS 15 includes two buffers (or source follower amplifiers) and a sampling capacitor for simultaneously storing the level of the reset signal and the level of the sensed signal. If the output signal of the pixel array 14 exceeds the linear input range of the CDS circuit 15, the image signal is then distorted. In the CDS circuit 15, considering a bandwidth or a frequency thereof, and considering the linear input range, the buffers (or the source follower amplifiers) are generally formed by single stage amplifiers or two-stage amplifiers.

U.S. Pat. No. 5,965,871 provides a plurality of the CDS circuits, but some of the CDS circuits provided thereof still have the problem of insufficient linear input range. Though other CDS circuits provided thereof solve the problem of insufficient linear input range, the gains of the buffers (the source follower amplifiers) thereof are decreased, which may lead to the design difficulty of the rear PGA and the ADC.

According to the U.S. Pat. No. 5,965,871, the linear input range of the CDS circuit is increased by applying a coupling capacitor. Moreover, a bias source is applied for reducing an unmatched problem of devices thereof. Since the coupling capacitor is applied, gains of the buffers (or the source follower amplifiers) thereof are decreased. Moreover, applying of the bias source may bring noises to the CDS circuit, and therefore the CDS circuits provided by the U.S. Pat. No. 5,965,871 are still required to be improved.

Moreover, the bias source has to provide biases to all the CDS circuits within the image sensor. If the bias source has the noise, performances of all the CDS circuits are influenced. In addition, since a distribution range of the CDS circuits within the image sensor is relatively great, it is a great challenge for providing a stable and accordant bias source.

In summary, increasing the linear input range of the conventional CDS may lead to decreasing of gains and increasing of circuit noises, and accordingly may lead to design difficulty of the rear circuits and deterioration of image quality thereof.

SUMMARY OF THE INVENTION

The present invention is directed to a correlated double sampling (CDS) circuit, which may shift levels of a sampled sensed signal and a sampled reset signal, so that the shifted sensed signal and the shifted reset signal may fall within a linear input range thereof.

The present invention is directed to a CMOS image sensor unit, in which a CDS circuit thereof may shift levels of a sampled sensed signal and a sampled reset signal, so that the shifted sensed signal and the shifted reset signal may fall within a linear input range thereof.

The present invention provides a CDS circuit having an input terminal, a first output terminal and a second output terminal. The CDS circuit includes a first sampling-and-holding unit, a second sampling-and-holding unit, a first level-shifting unit, a second level-shifting unit, a first buffer and a second buffer. Wherein, the first sampling-and-holding unit is coupled to the input terminal, and the second sampling-and-holding unit is coupled to the input terminal. The first level-shifting unit is coupled to the first sampling-and-holding unit, and the second level-shifting unit is coupled to the second sampling-and-holding unit. The first buffer is coupled between the first level-shifting unit and the first output terminal, and the second buffer is coupled between the second level-shifting unit and the second output terminal. The first sampling-and-holding unit samples or holds a sensed signal according to a first control signal, and the second sampling-and-holding unit samples or holds a reset signal according to a second control signal. The first level-shifting unit shifts a level of an output voltage of the first sampling-and-holding unit according to at least one level control signal, and the second level-shifting unit shifts a level of an output voltage of the second sampling-and-holding unit according to the level control signal. The first buffer is used for buffering an output of the first level-shifting unit, and the second buffer is used for buffing an output of the second level-shifting unit.

According to an embodiment of the present invention, a shifting amount of the output voltage of the first sampling-and-holding unit shifted by the first level-shifting unit is equal to a shifting amount of the output voltage of the second sampling-and-holding unit shifted by the second level-shifting unit.

According to an embodiment of the present invention, the CDS circuit further includes a first switch coupled between outputs of the first and the second sampling-and-holding units, and controlled by a hold control signal.

According to an embodiment of the present invention, the CDS circuit further includes a first inverter used for outputting an inverted signal of the level control signal. The first level-shifting unit further includes a first capacitor having one terminal coupled to the first inverter, and another terminal coupled to the first buffer and the first sampling-and-holding unit. Moreover, the second level-shifting unit further includes a second capacitor having one terminal coupled to the first inverter, and another terminal coupled to the second buffer and the second sampling-and-holding unit.

According to an embodiment of the present invention, the first level-shifting unit includes a first capacitor, a second switch and a third switch. One terminal of the first capacitor is coupled to the second switch and the third switch, and another terminal thereof is coupled to the first buffer and the first sampling-and-holding unit. The second and the third switches are controlled by the level control signal, by which when the second switch is turned on, the third switch is then turned off, and the first capacitor receives a first voltage source via the second switch; when the third switch is turned on, the second switch is then turned off, and the first capacitor receives a second voltage source via the third switch. The second level-shifting unit includes a second capacitor, a fourth switch and a fifth switch. One terminal of the second capacitor is coupled to the fourth switch and the fifth switch, and another terminal thereof is coupled to the second buffer and the second sampling-and-holding unit. The fourth and the fifth switches are controlled by the level control signal, by which when the fourth switch is turned on, the fifth switch is then turned off, and the second capacitor receives the first voltage source via the fourth switch; when the fifth switch is turned on, the fourth switch is then turned off, and the second capacitor receives the second voltage source via the fifth switch.

The present invention provides a CMOS image sensor unit including a timing generator, a row decoder, a column decoder, a pixel array, a CDS circuit and an analog signal processing (ASP) unit. The CDS circuit has an input terminal, a first output terminal and a second output terminal, and includes a first sampling-and-holding unit, a second sampling-and-holding unit, a first level-shifting unit, a second level-shifting unit, a first buffer and a second buffer. Wherein, the row decoder is coupled to the timing generator, the column decoder is coupled to the timing generator, and the pixel array is coupled to the row decoder. The CDS circuit is coupled to the pixel array, the timing generator and the column decoder, and the ASP unit is coupled to the first output terminal and the second output terminal of the CDS circuit. The first sampling-and-holding unit is coupled to the input terminal, and the second sampling-and-holding unit is coupled to the input terminal. The first level-shifting unit is coupled to the first sampling-and-holding unit, and the second level-shifting unit is coupled to the second sampling-and-holding unit. The first buffer is coupled between the first level-shifting unit and the first output terminal, and the second buffer is coupled between the second level-shifting unit and the second output terminal. The pixel array senses images for generating a sensed signal and providing a reset signal. The ASP unit amplifies a voltage difference of the first output terminal and the second output terminal, and performs analog-to-digital conversion to the amplified voltage difference of the first output terminal and the second output terminal, so as to output a digital image signal. The first sampling-and-holding unit samples or holds the sensed signal according to a first control signal, and the second sampling-and-holding unit samples or holds the reset signal according to a second control signal. The first level-shifting unit shifts a level of an output voltage of the first sampling-and-holding unit according to at least one level control signal, and the second level-shifting unit shifts a level of an output voltage of the second sampling-and-holding unit according to the level control signal. The first buffer is used for buffering an output of the first level-shifting unit, and the second buffer is used for buffing an output of the second level-shifting unit.

According to an embodiment of the present invention, a shifting amount of the output voltage of the first sampling-and-holding unit shifted by the first level-shifting unit is equal to a shifting amount of the output voltage of the second sampling-and-holding unit shifted by the second level-shifting unit.

According to an embodiment of the present invention, the CDS circuit further includes a first switch coupled between outputs of the first and the second sampling-and-holding units, and controlled by a hold control signal.

According to an embodiment of the present invention, the CDS circuit further includes a first inverter used for outputting an inverted signal of the level control signal. The first level-shifting unit includes a first capacitor having one terminal coupled to the first inverter, and another terminal coupled to the first buffer and the first sampling-and-holding unit. Moreover, the second level-shifting unit further includes a second capacitor having one terminal coupled to the first inverter, and another terminal coupled to the second buffer and the second sampling-and-holding unit.

According to an embodiment of the present invention, the first level-shifting unit includes a first capacitor, a second switch and a third switch. One terminal of the first capacitor is coupled to the second switch and the third switch, and another terminal thereof is coupled to the first buffer and the first sampling-and-holding unit. The second and the third switches are controlled by the level control signal, by which when the second switch is turned on, the third switch is then turned off, and the first capacitor receives a first voltage source via the second switch; when the third switch is turned on, the second switch is then turned off, and the first capacitor receives a second voltage source via the third switch. The second level-shifting unit includes a second capacitor, a fourth switch and a fifth switch. One terminal of the second capacitor is coupled to the fourth switch and the fifth switch, and another terminal thereof is coupled to the second buffer and the second sampling-and-holding unit. The fourth and the fifth switches are controlled by the level control signal, by which when the fourth switch is turned on, the fifth switch is then turned off, and the second capacitor receives the first voltage source via the fourth switch; when the fifth switch is turned on, the fourth switch is then turned off, and the second capacitor receives the second voltage source via the fifth switch.

For the CDS circuit and the CMOS image sensor unit of the present invention, since the CDS circuit shifts levels of the sampled sensed signal and the sampled reset signal with equal amounts, the voltage difference of the sampled sensed signal and the reset signal remains unchanged, and their levels may fall within a linear input range by adjusting their levels. Compared to a conventional CDS circuit, a gain of the CDS circuit provided by the embodiment of the present invention is not reduced, and thus a design complexity of a rear circuit thereof is lower, and an induced noise is relatively low. Furthermore, the CMOS image sensor unit using the CDS circuit provided by the embodiment of the present invention also has these advantages.

In order to make the aforementioned and other objects, features and advantages of the present invention comprehensible, a preferred embodiment accompanied with figures is described in detail below.

DESCRIPTION OF EMBODIMENTS

The present invention provides a correlated double sampling (CDS) circuit and a CMOS image sensor unit using the same. Since the CDS circuit shifts levels of a sampled sensed signal and a sampled reset signal with equal amounts, a voltage difference of the sampled sensed signal and the reset signal remains unchanged, and their levels may fall within a linear input range by adjusting their levels. In order to make features and advantages of the present invention comprehensible, in the following content, embodiments are described in detail with reference to the accompanying drawings.

Figure 1:
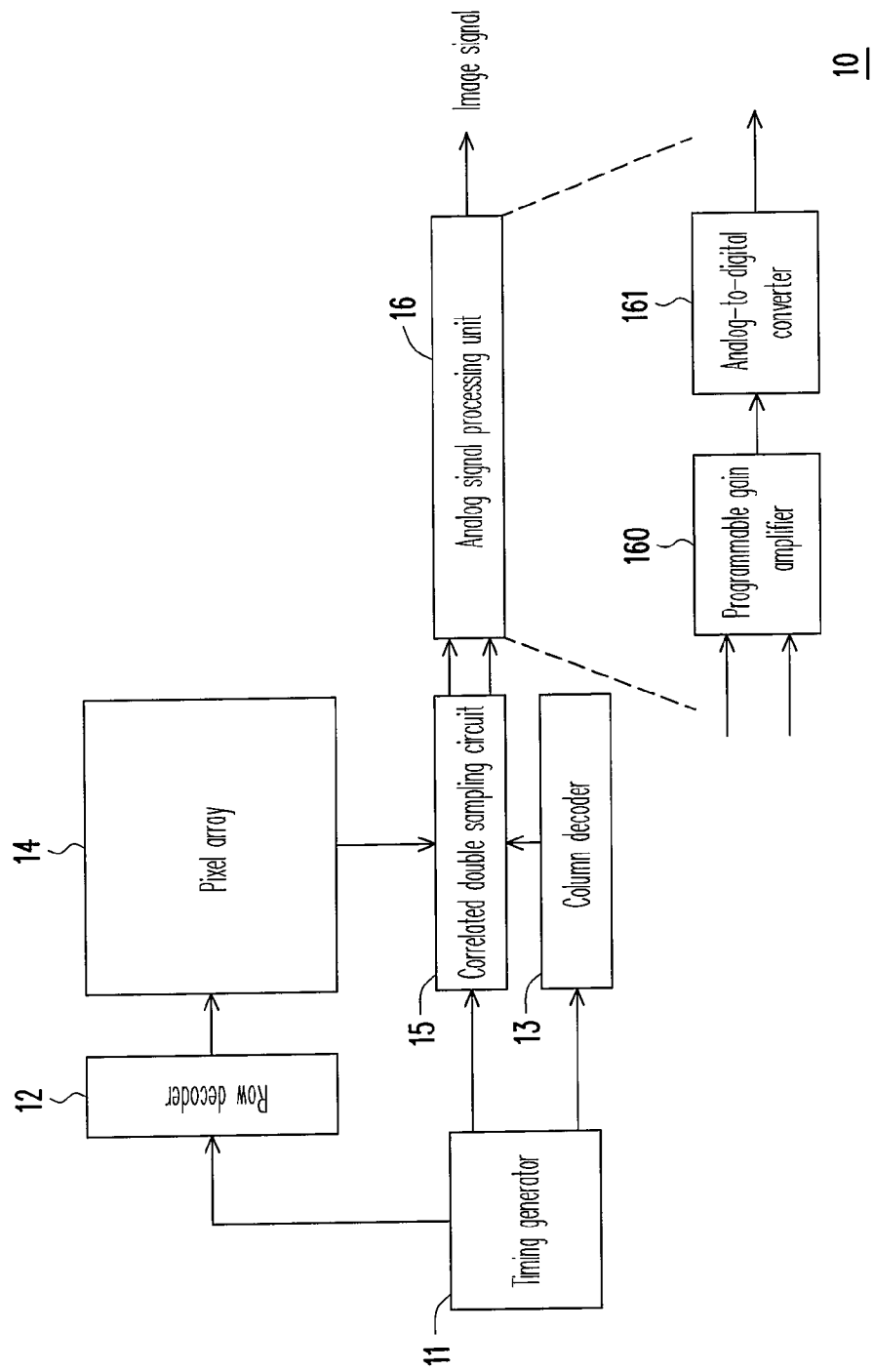
FIG. 1 is a block diagram illustrating a conventional CMOS image sensor unit 10.
Figure 2A:
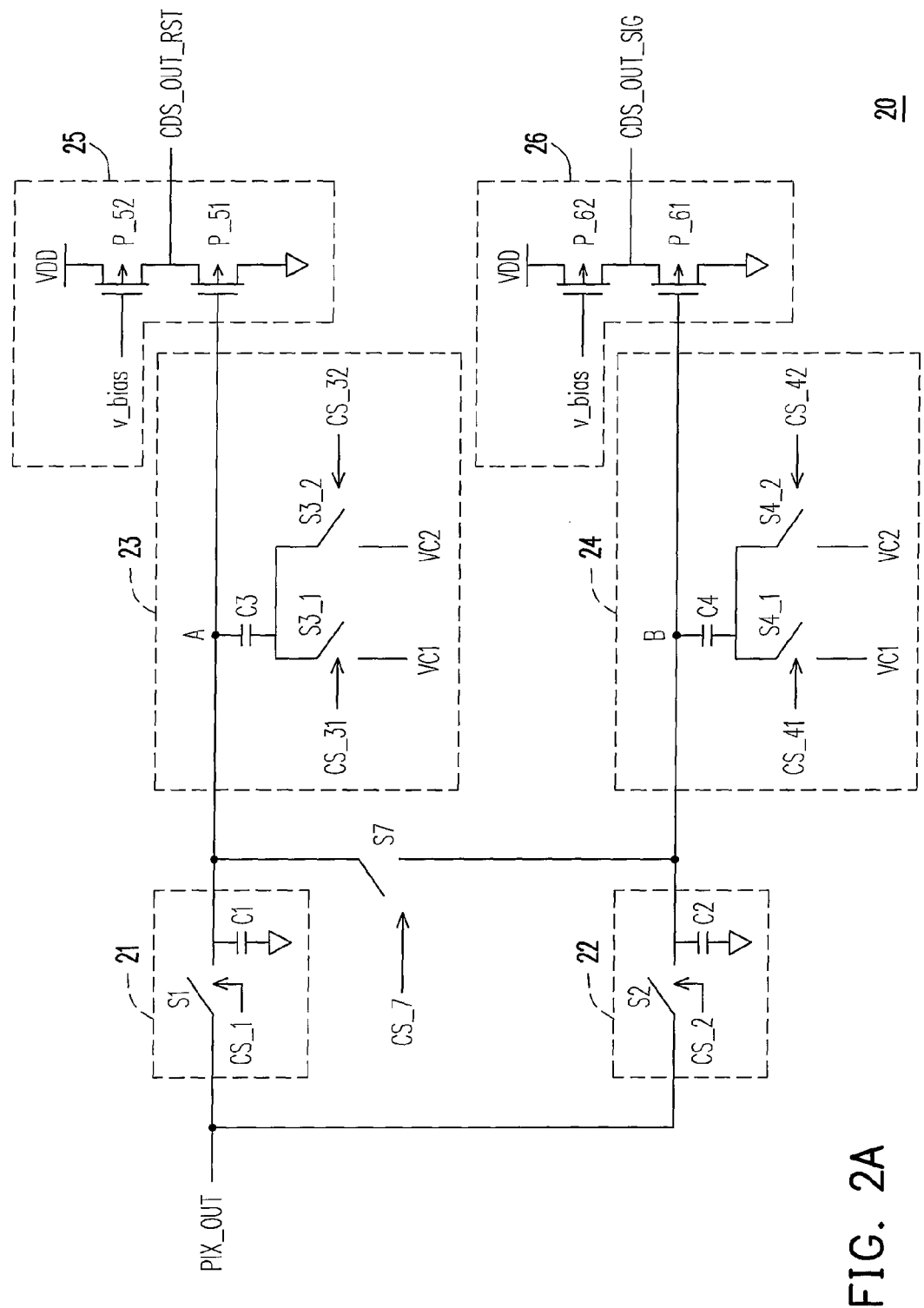
FIG. 2A is a circuit diagram illustrating a CDS circuit 20 according to an embodiment of the present invention.

Referring to FIG. 2A, FIG. 2A is a circuit diagram illustrating a CDS circuit 20 according to an embodiment of the present invention. The CDS circuit 20 has an input terminal PIX_OUT and output terminals CDS_OUT_RST and CDS_OUT_SIG. The CDS circuit 20 includes sampling-and-holding units 21 and 22, level-shifting units 23 and 24, buffers 25 and 26, and a switch S7. Wherein, the sampling-and-holding units 21 and 22 are coupled to the input terminal PIX_OUT, the level-shifting unit 23 is coupled to the sampling-and-holding unit 21, and the level-shifting unit 24 is coupled to the sampling-and-holding unit 22. The buffer 25 is coupled between the level-shifting unit 23 and the output terminal CDS_OUT_RST, and the buffer 26 is coupled between the level-shifting unit 24 and the output terminal CDS_OUT_SIG. Moreover, the switch S7 is coupled between outputs of the sampling-and-holding units 21 and 22.

The sampling-and-holding unit 21 samples or holds a reset signal RST according to a control signal CS_1. The sampling-and-holding unit 21 includes a switch S1 and a capacitor C1. In the present embodiment, one terminal of the capacitor C1 is coupled to ground, another terminal thereof is coupled to an output terminal of the switch S1, and an input terminal of the switch S1 is coupled to the input terminal PIX_OUT. If an input signal of the input terminal PIX_OUT is the reset signal RST, the switch S1 is then turned on in response to the control signal CS_1, so that the reset signal RST may charge the capacitor C1 to implement the sampling operation. If the input signal of the input terminal PIX_OUT is not the reset signal RST, the switch S1 is turned off in response to the control signal CS_1, so that voltage of the reset signal RST may be held to the capacitor C1 to implement the holding operation.

The sampling-and-holding unit 22 samples or holds a sensed signal SIG according to a control signal CS_2. The sampling-and-holding unit 22 includes a switch S2 and a capacitor C2. In the present embodiment, one terminal of the capacitor C2 is coupled to the ground, another terminal thereof is coupled to an output terminal of the switch S2, and an input terminal of the switch S2 is coupled to the input terminal PIX_OUT. Operation of the sampling-and-holding unit 22 is similar to that of the sampling-and-holding unit 21, and thereof detailed description thereof will not be repeated.

The level-shifting unit 23 shifts a level of an output voltage of the sampling-and-holding unit 21 according to level control signals CS_21 and CS_32. In the present embodiment, the level shifting is performed according to two level control signals CS_31 and CS_32, and such number of the level control signals is not intended to limit the present invention.

In the present embodiment, the level-shifting unit 23 includes a capacitor C3 and switches S3_1 and S3_2. One terminal of the capacitor C3 is coupled to the buffer 25 and the sampling-and-holding unit 21, one terminal of the switches S3_1 and S3_2 are coupled to another terminal of the capacitor C3, and the other terminals of the switches S3_1 and S3_2 are respectively coupled to a voltage source VC1 and a voltage source VC2. The switches S3_1 and S3_2 are respectively controlled by the level control signals CS_31 and CS_32. When the switch S3_2 is turned on, the switch S3_1 is then turned off, and now another terminal of the capacitor C3 is coupled to the voltage source VC2 via the switch S3_2; when the switch S3_1 is turned on, the switch S3_2 is then turned off, and now another terminal of the capacitor C3 is coupled to the voltage source VC1 via the switch S3_1. By such means, the voltage of a node A then may control a level-shifting amount thereof according to the level control signals CS_31 and CS_32, so as to achieve the level-shifting function.

The level-shifting unit 24 shifts a level of an output voltage of the sampling-and-holding unit 22 according to level control signals CS_41 and CS_42. In the present embodiment, the level shifting is performed according to two level control signals CS_41 and CS_42, but such number of the level control signals is not intended to limit the present invention. The level-shifting unit 24 includes a capacitor C4, switches S4_1 and S4_2, and coupling relations thereof is similar to that of the level-shifting unit 23, and therefore detailed description thereof will not be repeated.

It should be noted that to equalize a voltage difference of the shifted sensed signal SIG and the shifted reset signal RST to the voltage difference of the sensed signal SIG and the reset signal RST that before being shifted, the level-shifting units 23 and 24 need to shift levels of the voltages of the node A and the node B with equal amounts. Moreover, the level control signal CS_31 may be the same to the level control signal CS_41, and the level control signal CS_32 may also be the same to the level control signal CS_42, while the level control signals CS_31 and CS_32 may be inverted control signals of each other, the voltage source VC2 may be coupled to a ground terminal, and the voltage source VC1 may be a voltage source with a high level. However, the above signal relation is only an exemplary example, and the present invention is not limited thereto.

The buffer 25 is used for buffering an output of the level-shifting unit 23. In the present embodiment, the buffer 25 is embodied by a source follower amplifier. The buffer 25 includes two P-type field effect transistors P_51 and P_52, wherein a gate of the P-type field effect transistor P_52 is coupled to a fixed bias v_bias, a drain thereof is coupled to a source of the P-type field effect transistor P_51, and a source thereof is coupled to a supply voltage source VDD. A gate of the P-type field effect transistor P_51 is coupled to the level-shifting unit 23, and a drain thereof is coupled to the ground.

The buffer 26 is used for buffering an output of the level-shifting unit 24. In the present embodiment, the buffer 26 is embodied by the source follower amplifier. The buffer 26 includes two P-type field effect transistors P_61 and P_62, and a coupling relation thereof is similar to that of the buffer 25, and thereof detailed description thereof will not be repeated.

The buffers 25 and 26 have a limitation of a linear input range, and therefore input signals of a conventional CDS circuit may have a distortion problem. In the present embodiment, by applying the level-shifting circuits 23 and 24, levels of the input signals of the buffers 25 and 26 may be shifted with the equal amounts, so as to meet with the linear input range and avoid the distortion problem.

The switch S7 is controlled by a hold control signal CS_7, and is mainly used for compensating unmatched problems of the devices in the present embodiment. When the switch S7 is turned on, voltages of the nodes A and B are the same. A voltage difference of the output terminals CDS_OUT_RST and the CDS_OUT_SIG before the switch S7 being turned on minus a voltage difference of the output terminals CDS_OUT_RST and the CDS_OUT_SIG after the switch S7 being turned on may remove voltage offsets of the devices caused by the unmatched problem there between. However, if the unmatched problem of the devices is not serious, the switch S7 may be removed. If the voltage offsets of the devices caused by the unmatched problem are fixed, the switch S7 then may also be removed, and now a rear circuit of the CDS circuit 20 may be designed to remove the fixed voltage offsets, so as to achieve a same function as described above.

Figure 2B:
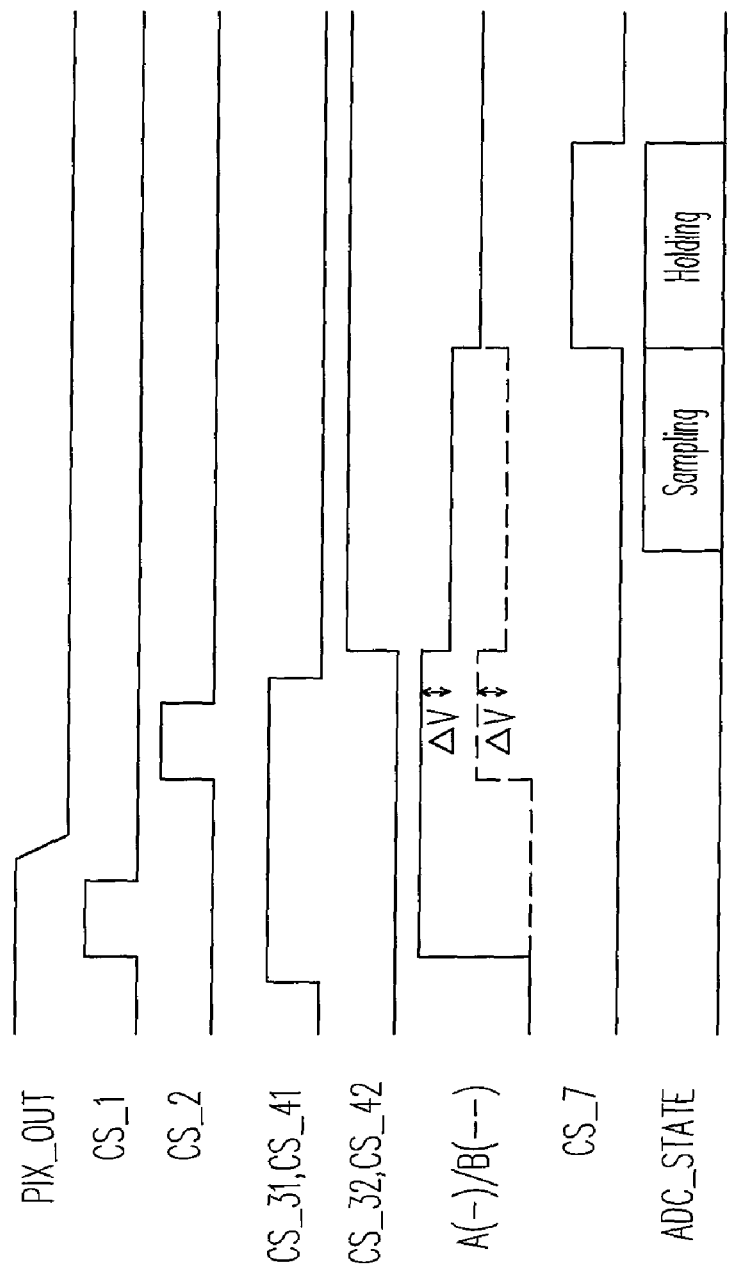
FIG. 2B is a signal waveform diagram of the CDS circuit 20.

Next, referring to FIG. 2B, FIG. 2B is a signal waveform diagram of the CDS circuit 20. When the reset signal RST is input to the CDS circuit 20 via the input terminal PIX_OUT, the sampling-and-holding unit 21 samples the reset signal RST in response to the control signal CS_1. When the sensed signal SIG is input to the CDS circuit 20 via the input terminal PIX_OUT, the sampling-and-holding unit 22 samples the sensed signal SIG in response to the control signal CS_2.

Now, capacitors C3 and C4 are coupled to the voltage source VC1 via the switches S3_1 and S4_1 under control of the level control signals CS_31 and CS_41. Next, the capacitors C3 and C4 are coupled to the voltage source VC2 via the switches S3_2 and S4_2 under control of the level control signals CS_32 and CS_42. By such means, voltages of the nodes A and B may simultaneously drop Δv volts, so that the voltages of the nodes A and B may fall within the linear input range of the buffers 25 and 26.

Moreover, when the CDS circuit 20 is applied to the CMOS image sensor unit, the CDS circuit 20 is generally coupled to an analog-to-digital converter (ADC). When levels of the voltages of the nodes A and B are simultaneously shifted, a state ADC_STATE of the ADC is a sampling state. Next, when the switch S7 is turned on in response to the hold control signal CS_7, the state ADC_STATE of the ADC is a holding state. As described above, the voltage difference of the output terminals CDS_OUT_RST and the CDS_OUT_SIG before the switch S7 being turned on minus the voltage difference of the output terminals CDS_OUT_RST and the CDS_OUT_SIG after the switch S7 being turned on may remove voltage offsets of the devices caused by the unmatched problem therebetween.

Referring to FIG. 2A and FIG. 2B, in case that loads of the buffers 25 and 26 are not taken into consideration, and assuming the capacitors C1 and C2 are respectively 9 pico farads, the capacitors C3 and C4 are respectively 1 pico farad, the voltage sources VC1 and VC2 are respectively 2 volts and 0 volt, the reset signal and the sensed signal are respectively 1.6 volts and 1 volt, and the linear input range of the buffers 25 and 26 is less than 1.5 volts, then, after samplings of the sampling-and-holding units 21 and 22 are completed, the voltages of the nodes A and B are respectively 1.6 volts and 1 volt, and now the switches S3_1 and S4_1 are turned on, and the voltage of the node A exceeds the linear input range. Next, since the switches S3_2 and S4_2 are turned on, the voltage of the node A then is 1.6−(2−0)/(9+1)=1.4 volts, and the voltage of the node B is 1−(2−0)/(9+1)=0.8 volts. Therefore, by shifting the levels of the sensed signal and the reset signal sampled by the sampling-and-holding units 21 and 22 with equal amounts, the outputs of the sampling-and-holding units 21 and 22 then may fall within the linear input range of the buffers 25 and 26, and gains of the buffers 25 and 26 are not decreased.

Figure 3A:
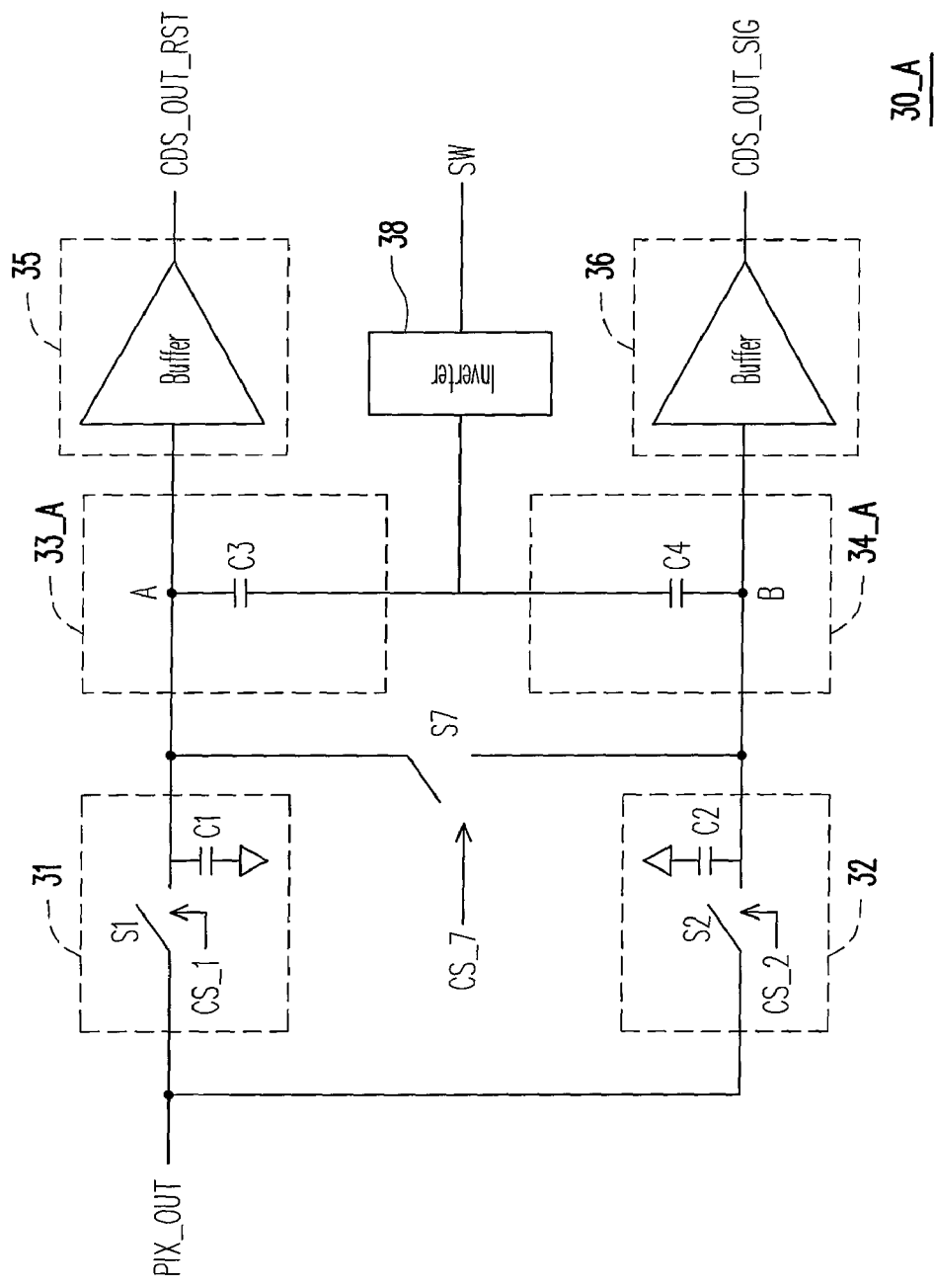
FIG. 3A is a circuit diagram illustrating a CDS circuit 30_A according to an embodiment of the present invention.

Next, referring to FIG. 3A, FIG. 3A is a circuit diagram illustrating a CDS circuit 30_A according to an embodiment of the present invention. The CDS circuit 30_A is similar to the CDS circuit 20 of FIG. 2A, and a difference there between is that level-shifting units 33_A and 34_A only respectively have the capacitors C3 and C4, and the level-shifting units 33_A and 34_A are coupled to an inverter 38, and may respectively shift levels of the voltages of the nodes A and B according to variations of a level control signal SW. Moreover, coupling relations and operational principles of the devices are similar to that of the CDS circuit 20, and therefore detailed description thereof will not be repeated.

Figure 3B:
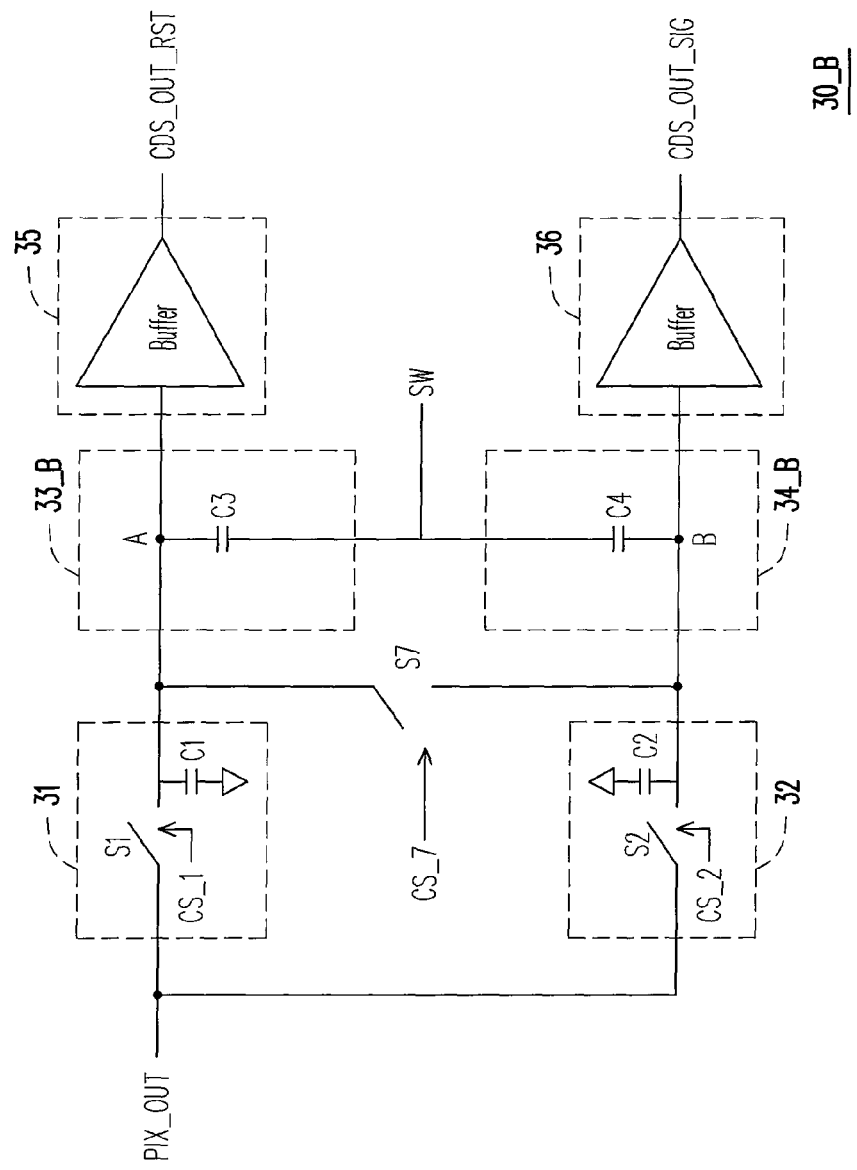
FIG. 3B is a circuit diagram illustrating a CDS circuit 30_B according to an embodiment of the present invention.

Referring to FIG. 3B, FIG. 3B is a circuit diagram illustrating a CDS circuit 30_B according to an embodiment of the present invention. A difference between the CDS circuit 30_B and the CDS circuit 30_A of FIG. 3A is that the inverter 38 is not applied. Since the level control signal SW may be varied, during variation thereof, the voltages of the nodes A and B are consequently influenced, and accordingly levels of the voltages of the nodes A and B may be shifted. Moreover, coupling relations and operational principles of the devices of the CDS circuit 30_B are similar to that of the CDS circuit 30_A, and therefore detailed description thereof will not be repeated.

Figure 3C:
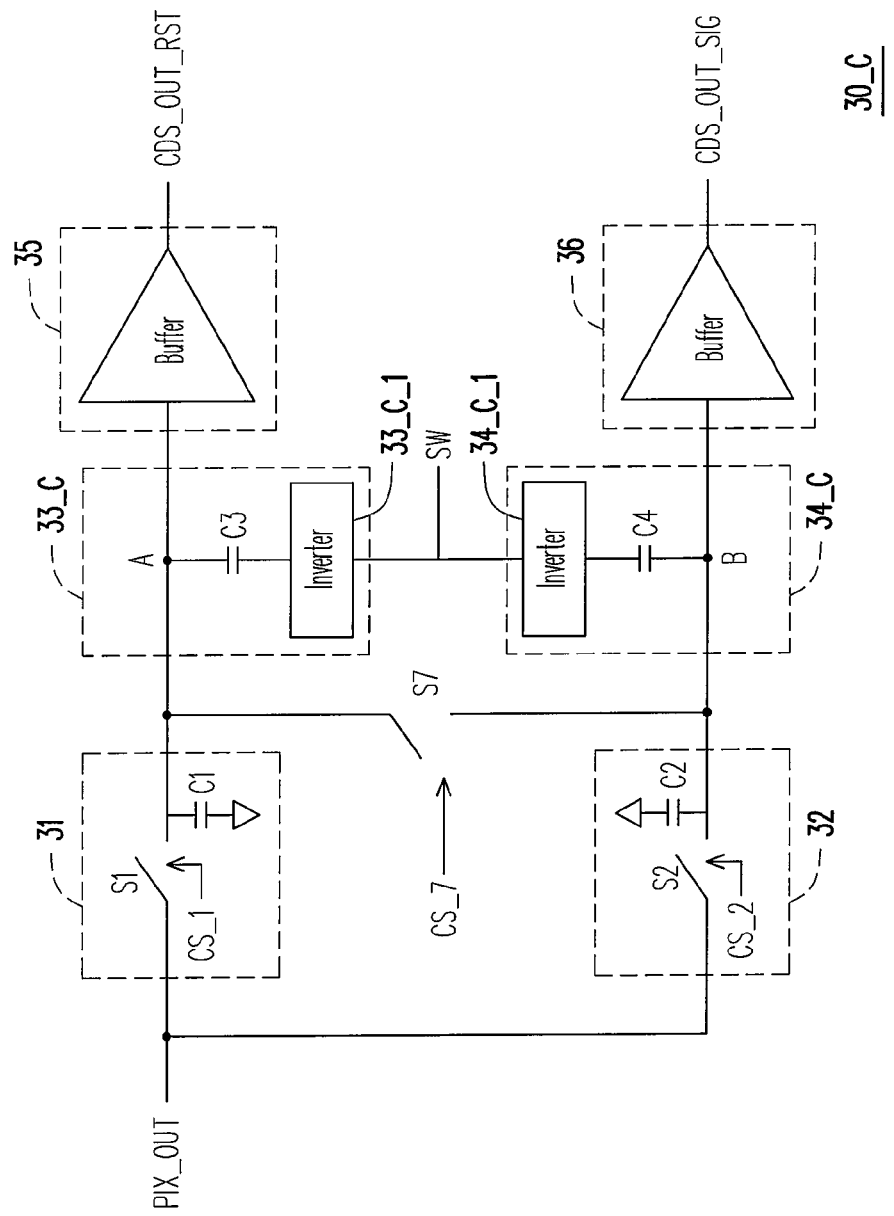
FIG. 3C is a circuit diagram illustrating a CDS circuit 30_C according to an embodiment of the present invention.

Referring to FIG. 3C, FIG. 3C is a circuit diagram illustrating a CDS circuit 30_C according to an embodiment of the present invention. A difference between the CDS circuit 30_C and the CDS circuit 30_A of FIG. 3A is that the inverter 38 is moved into the level-shifting units 33_C and 34_C, so that the level-shifting unit 33_C includes the capacitor C3 and an inverter 33_C_1, and the level-shifting unit 34_C includes the capacitor C4 and an inverter 34_C_1. Moreover, coupling relations and operational principles of the devices of the CDS circuit 30_C are similar to that of the CDS circuit 30_A, and therefore detailed description thereof will not be repeated.

As to the embodiments of FIG. 3A to FIG. 3C, if an effective load of the buffers 35 and 36 is considered to be Cb, and the capacitor C3 is equal to the capacitor C4, the capacitor C1 is equal to the capacitor C2, a low level of the level control signal SW is 0 volt, and a high level thereof is VDD. Then, when the level control signal SW is varied from the low level to the high level, the voltages of the nodes A and B are respectively added with a shifting amount of VDD*C3/(C1+C3+Cb), and when the level control signal SW is varied from the high level to the low level, a shifting amount of VDD*C3/(C1+C3+Cb) is respectively subtracted from the voltages of the nodes A and B. Based on variations of the level control signal SW, the voltages of the nodes A and B then may fall within the linear input range of the buffers 35 and 36.

Figure 4:
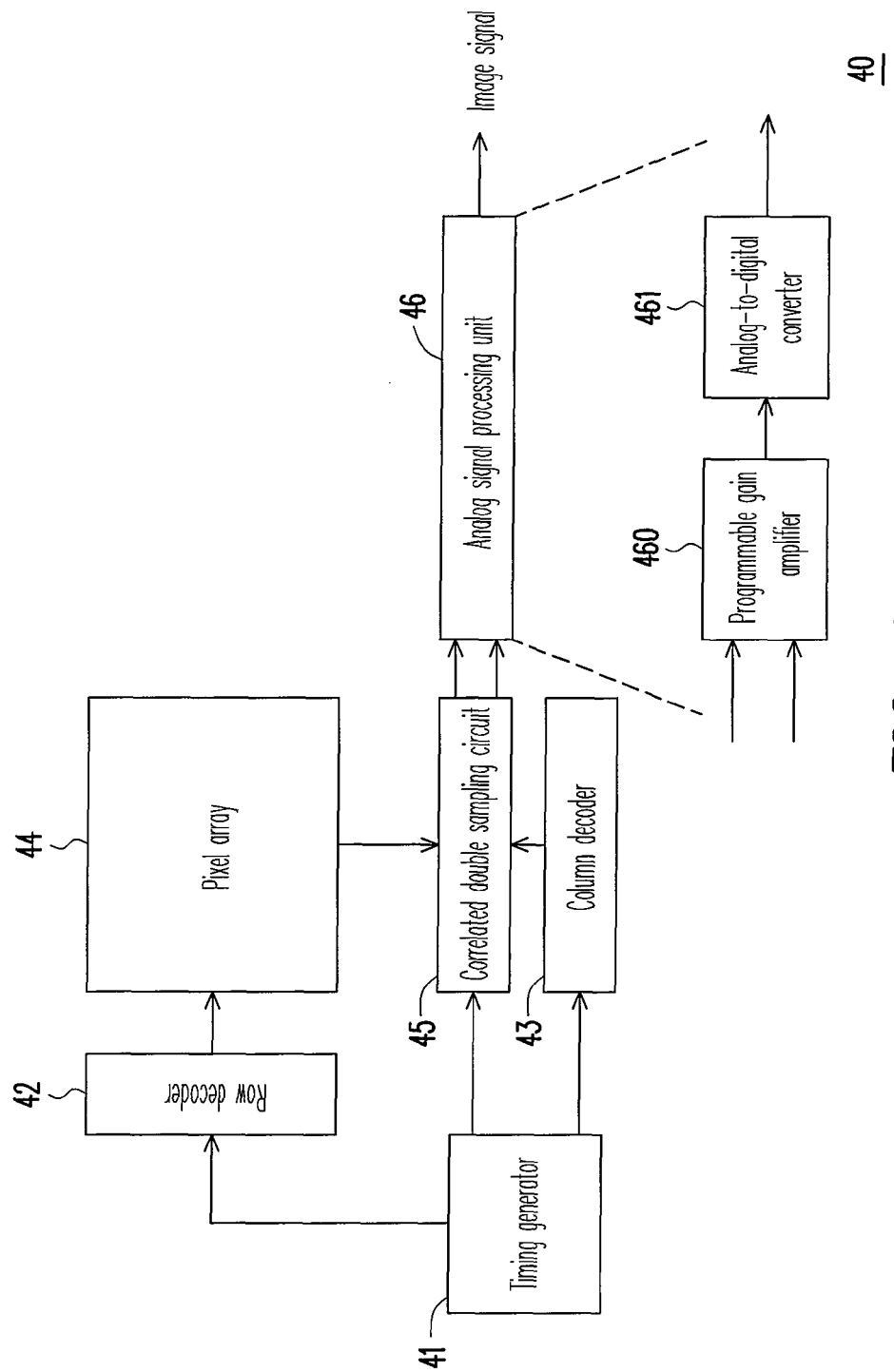
FIG. 4 is a block diagram illustrating a CMOS image sensor unit 40 according to an embodiment of the present invention.

Finally, referring to FIG. 4, FIG. 4 is a block diagram illustrating a CMOS image sensor unit 40 according to an embodiment of the present invention. The CMOS image sensor unit 40 includes a timing generator 41, a row decoder 42, a column decoder 43, a pixel array 44, a CDS circuit 45 and an ASP unit 46. The CDS circuit 45 has an input terminal, a first output terminal and a second output terminal. Wherein, the row decoder 42 is coupled to the timing generator 41, the column decoder 43 is coupled to the timing generator 41, and the pixel array 44 is coupled to the row decoder 42. The CDS circuit 45 is coupled to the pixel array 44, the timing generator 41 and the column decoder 42, and the ASP unit 46 is coupled to two output terminals of the CDS circuit 45.

The pixel array 44 is used for sensing images to generate the sensed signal SIG and the reset signal RST. The ASP unit 46 is used for amplifying a voltage difference of the two output terminals of the CDS circuit 45, and performing an analog-to-digital conversion to the amplified voltage difference to output a digital image signal.

The ASP unit 46 includes a programmable gain amplifier (PGA) 460 and an analog-to-digital converter (ADC) 461. The PGA 460 is coupled to the two output terminals of the CDS circuit 45, and the ADC 461 is coupled to the PGA 460. The PGA 460 is used for amplifying the voltage difference of the two output terminals of the CDS circuit 45 according to a preset gain. The ADC 461 is used for performing the analog-to-digital conversion to an output of the PGA 460, so as to generate the digital image signal.

The CDS circuit 45 shifts levels of the sampled sensed signal SIG and the sampled reset signal RST with equal amounts, and outputs the shifting results via buffers thereof. An embodiment of the CDS circuit 45 may be one of the CDS circuits 20, 30_A, 30_B and 30_C of FIG. 2A and FIGS. 3A~3C, however these implementations do not intend to limit the scoped of the present invention.

In summary, for the CDS circuit and the CMOS image sensor unit of the present invention, since the CDS circuit shifts levels of the sampled sensed signal and the sampled reset signal with equal amounts, the voltage difference of the sampled sensed signal and the sampled reset signal remains unchanged, though their levels may fall within the linear input range by adjusting their levels. Compared to a conventional CDS circuit, a gain of the CDS circuit provided by the embodiment of the present invention is not reduced, and thus a design complexity of a follow-up circuit is lower, and an induced noise is relatively low. Furthermore, the CMOS image sensor unit using the CDS circuit provided by the embodiment of the present invention also has these advantages.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A correlated double sampling (CDS) circuit, having an input terminal, a first output terminal and a second output terminal, comprising:
    a first sampling-and-holding unit, coupled to the input terminal, configured to sample or hold a sensed signal according to a first control signal;
    a second sampling-and-holding unit, coupled to the input terminal, configured to sample or hold a reset signal according to a second control signal;
    a first level-shifting unit, coupled to the first sampling-and-holding unit, configured to shift a level of an output voltage of the first sampling-and-holding unit according to at least one level control signal;
    a second level-shifting unit, coupled to the second sampling-and-holding unit, configured to shift a level of an output voltage of the second sampling-and-holding unit according to the level control signal;
    a first buffer, coupled between the first level-shifting unit and the first output terminal, for buffering an output of the first level-shifting unit; and
    a second buffer, coupled between the second level-shifting unit and the second output terminal, for buffering an output of the second level-shifting unit.

2. The CDS circuit as claimed in claim 1, wherein a shifting amount of the output voltage of the first sampling-and-holding unit shifted by the first level-shifting unit is equal to a shifting amount of the output voltage of the second sampling-and-holding unit shifted by the second level-shifting unit.

3. The CDS circuit as claimed in claim 1 further comprising:
    a first switch, coupled between outputs of the first sampling-and-holding unit and the second sampling-and-holding unit, and controlled by a hold control signal.

4. The CDS circuit as claimed in claim 1, wherein the first level-shifting unit comprises a first capacitor having a terminal coupled to the level control signal, and another terminal coupled to the first buffer and the first sampling-and-holding unit; and the second level-shifting unit comprises a second capacitor having a terminal coupled to the level control signal, and another terminal coupled to the second buffer and the second sampling-and-holding unit.

5. The CDS circuit as claimed in claim 4 further comprises a first inverter coupled to the first capacitor and the second capacitor, and configured to output an inverted signal of the level control signal to the first and second capacitors.

6. The CDS circuit as claimed in claim 1, wherein the first level-shifting unit comprises a first inverter and a first capacitor, the first inverter receives the level control signal and outputs an inverted signal of the level control signal, a terminal of the first capacitor is coupled to the first inverter, and another terminal thereof is coupled to the first buffer and the first sampling-and-holding unit; the second level-shifting unit comprises a second inverter and a second capacitor, the second inverter receives the level control signal and outputs an inverted signal of the level control signal, a terminal of the second capacitor is coupled to the second inverter, and another terminal thereof is coupled to the second buffer and the second sampling-and-holding unit.

7. The CDS circuit as claimed in claim 1, wherein the first level-shifting unit comprises a first capacitor, a second switch and a third switch, wherein a terminal of the first capacitor is coupled to the second switch and the third switch, and another terminal thereof is coupled to the first buffer and the first sampling-and-holding unit; the second switch and the third switch are controlled by the level control signal, wherein when the second switch is turned on, the third switch is then turned off, and the first capacitor receives a first voltage source via the second switch; when the third switch is turned on, the second switch is then turned off, and the first capacitor receives a second voltage source via the third switch; the second level-shifting unit comprises a second capacitor, a fourth switch and a fifth switch, wherein a terminal of the second capacitor is coupled to the fourth switch and the fifth switch, and another terminal thereof is coupled to the second buffer and the second sampling-and-holding unit; the fourth switch and the fifth switch are controlled by the level control signal, wherein when the fourth switch is turned on, the fifth switch is then turned off, and the second capacitor receives the first voltage source via the fourth switch; when the fifth switch is turned on, the fourth switch is then turned off, and the second capacitor receives the second voltage source via the fifth switch.

8. The CDS circuit as claimed in claim 1, wherein the first sampling-and-holding unit comprises a sixth switch and a third capacitor, wherein a terminal of the third capacitor is coupled to the sixth switch and the first level-shifting unit, and the sixth switch is couple to the input terminal and controlled by the first control signal; the second sampling-and-holding unit comprises a seventh switch and a fourth capacitor, wherein a terminal of the fourth capacitor is coupled to the seventh switch and the second level-shifting unit, and the seventh switch is couple to the input terminal and controlled by the second control signal.

9. The CDS circuit as claimed in claim 1, wherein the first buffer and the second buffer are source follower amplifiers.

10. A complementary metal-oxide-semiconductor (CMOS) image sensor unit, comprising:
a timing generator;
a row decoder, coupled to the timing generator;
a column decoder, coupled to the timing generator;
a pixel array, coupled to the row decoder, for sensing images to generate a sensed signal and a reset signal;
a CDS circuit, coupled to the pixel array, the timing generator and the column decoder, having an input terminal, a first output terminal and a second output terminal, and comprising:
a first sampling-and-holding unit, coupled to the input terminal, configured to sample or hold the sensed signal according to a first control signal;
a second sampling-and-holding unit, coupled to the input terminal, configured to sample or hold the reset signal according to a second control signal;
a first level-shifting unit, coupled to the first sampling-and-holding unit, configured to shift a level of an output voltage of the first sampling-and-holding unit according to at least one level control signal;
a second level-shifting unit, coupled to the second sampling-and-holding unit, configured to shift a level of an output voltage of the second sampling-and-holding unit according to the level control signal;
a first buffer, coupled between the first level-shifting unit and the first output terminal, for buffering an output of the first level-shifting unit; and
a second buffer, coupled between the second level-shifting unit and the second output terminal, for buffering an output of the second level-shifting unit; and
an analog signal processing (ASP) unit, coupled to the first output terminal and the second output terminal of the CDS circuit, for amplifying a voltage difference of the first output terminal and the second output terminal, and performing an analog-to-digital conversion to the amplified voltage difference of the first output terminal and the second output terminal, so as to output a digital image signal.

11. The CMOS image sensor unit as claimed in claim 10, wherein a shifting amount of the output voltage of the first sampling-and-holding unit shifted by the first level-shifting unit is equal to a shifting amount of the output voltage of the second sampling-and-holding unit shifted by the second level-shifting unit.

12. The CMOS image sensor unit as claimed in claim 10, wherein the CDS circuit further comprises:
a first switch, coupled between outputs of the first sampling-and-holding unit and the second sampling-and-holding unit, and controlled by a hold control signal.

13. The CMOS image sensor unit as claimed in claim 10, wherein the first level-shifting unit comprises a first capacitor having a terminal coupled to the level control signal, and another terminal coupled to the first buffer and the first sampling-and-holding unit; and the second level-shifting unit comprises a second capacitor having a terminal coupled to the level control signal, and another terminal coupled to the second buffer and the second sampling-and-holding unit.

14. The CMOS image sensor unit as claimed in claim 13, wherein the CDS circuit further comprises a first inverter coupled to the first capacitor and the second capacitor, and configured to output an inverted signal of the level control signal to the first and second capacitors.

15. The CMOS image sensor unit as claimed in claim 10, wherein the first level-shifting unit comprises a first inverter and a first capacitor, the first inverter receives the level control signal and outputs an inverted signal of the level control signal, a terminal of the first capacitor is coupled to the first inverter, and another terminal thereof is coupled to the first buffer and the first sampling-and-holding unit; the second level-shifting unit comprises a second inverter and a second capacitor, the second inverter receives the level control signal and outputs an inverted signal of the level control signal, a terminal of the second capacitor is coupled to the second inverter, and another terminal thereof is coupled to the second buffer and the second sampling-and-holding unit.

16. The CMOS image sensor unit as claimed in claim 10, wherein the first level-shifting unit comprises a first capacitor, a second switch and a third switch, wherein a terminal of the first capacitor is coupled to the second switch and the third switch, and another terminal thereof is coupled to the first buffer and the first sampling-and-holding unit; the second switch and the third switch are controlled by the level control signal, wherein when the second switch is turned on, the third switch is then turned off, and the first capacitor receives a first voltage source via the second switch; when the third switch is turned on, the second switch is then turned off, and the first capacitor receives a second voltage source via the third switch; the second level-shifting unit comprises a second capacitor, a fourth switch and a fifth switch, wherein a terminal of the second capacitor is coupled to the fourth switch and the fifth switch, and another terminal thereof is coupled to the second buffer and the second sampling-and-holding unit; the fourth switch and the fifth switch are controlled by the level control signal, wherein when the fourth switch is turned on, the fifth switch is then turned off, and the second capacitor receives the first voltage source via the fourth switch; when the fifth switch is turned on, the fourth switch is then turned off, and the second capacitor receives the second voltage source via the fifth switch.

17. The CMOS image sensor unit as claimed in claim 10, wherein the first sampling-and-holding unit comprises a sixth switch and a third capacitor, wherein a terminal of the third capacitor is coupled to the sixth switch and the first level-shifting unit, and the sixth switch is couple to the input terminal and controlled by the first control signal; the second sampling-and-holding unit comprises a seventh switch and a fourth capacitor, wherein a terminal of the fourth capacitor is coupled to the seventh switch and the second level-shifting unit, and the seventh switch is couple to the input terminal and controlled by the second control signal.

18. The CMOS image sensor unit as claimed in claim 10, wherein the first buffer and the second buffer are source follower amplifiers.

19. The CMOS image sensor unit as claimed in claim 10, wherein the ASP unit comprises:
   a programmable gain amplifier, coupled to the first output terminal and the second output terminal, for amplifying the voltage difference of the first output terminal and the second output terminal according to a preset gain; and
   an analog-to-digital converter, coupled to the programmable gain amplifier, for performing an analog-to digital conversion to an output of the programmable gain amplifier, so as to generate the digital image signal.

* * * * *